(12) United States Patent
Theobald et al.

(10) Patent No.: US 8,602,143 B2
(45) Date of Patent: Dec. 10, 2013

(54) ELECTRIC VEHICLE WITH RANGE-EXTENDING ENGINE AND CLIMATE CONTROL COMPRESSOR

(75) Inventors: Mark A. Theobald, Bloomfield Hills, MI (US); Edward D. Tate, Jr., Grand Blanc, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 13/049,968

(22) Filed: Mar. 17, 2011

(65) Prior Publication Data

US 2012/0234614 A1 Sep. 20, 2012

(51) Int. Cl.
*B60K 6/42* (2007.10)

(52) U.S. Cl.
USPC ............... 180/65.22; 180/291; 180/65.265

(58) Field of Classification Search
USPC ......... 180/68.1, 68.4, 53.8, 65.245, 291, 295, 180/65.22, 65.265; 165/41, 42, 43, 202; 237/12.3 R, 12.3 C, 12.4, 12.2, 28
See application file for complete search history.

(56) References Cited

U.S. PATENT DOCUMENTS

| | | | | |
|---|---|---|---|---|
| 3,844,130 A | * | 10/1974 | Wahnish | 62/133 |
| 5,251,721 A | * | 10/1993 | Ortenheim | 180/298 |
| 5,934,397 A | * | 8/1999 | Schaper | 180/65.245 |
| 6,048,288 A | * | 4/2000 | Tsujii et al. | 477/5 |
| 6,247,899 B1 | * | 6/2001 | Ban et al. | 417/16 |
| 6,390,215 B1 | * | 5/2002 | Kodama et al. | 180/65.22 |
| 6,459,166 B2 | * | 10/2002 | Yanase et al. | 290/40 C |
| 6,478,100 B1 | * | 11/2002 | Grewe | 180/65.245 |
| 6,662,580 B2 | * | 12/2003 | Suitou et al. | 62/228.1 |
| 6,898,499 B2 | * | 5/2005 | Arita et al. | 701/48 |
| 7,107,776 B2 | * | 9/2006 | Ikura et al. | 62/196.2 |
| 7,127,903 B2 | * | 10/2006 | Kuribayashi | 62/133 |
| 7,150,159 B1 | | 12/2006 | Brummett et al. | |
| 7,276,008 B2 | * | 10/2007 | Yasui et al. | 475/5 |
| 7,537,070 B2 | * | 5/2009 | Maslov et al. | 180/65.25 |
| 8,177,682 B2 | * | 5/2012 | Chang et al. | 477/6 |
| 2002/0056993 A1 | * | 5/2002 | Kennedy | 290/1 A |
| 2009/0107739 A1 | * | 4/2009 | Major et al. | 180/53.8 |
| 2010/0065344 A1 | * | 3/2010 | Collings, III | 180/2.1 |
| 2012/0055175 A1 | * | 3/2012 | Ting et al. | 62/61 |
| 2012/0193153 A1 | * | 8/2012 | Wellborn et al. | 180/14.2 |
| 2012/0286052 A1 | * | 11/2012 | Atluri et al. | 237/28 |

\* cited by examiner

*Primary Examiner* — Katy M Ebner
*Assistant Examiner* — Emma K Frick
(74) *Attorney, Agent, or Firm* — Quinn Law Group, PLLC

(57) ABSTRACT

A vehicle includes a vehicle body, a first motor disposed within the vehicle body, a second motor disposed within the vehicle body, and an engine removably disposed on the vehicle body and configured to selectively provide torque to the first motor when disposed on the vehicle body. A climate control compressor is disposed within the vehicle body and is selectively coupled to the first motor. A controller is configured to control the coupling of the climate control compressor to the first motor and to control the coupling of the engine to the first motor. The first motor is configured to generate electrical energy to operate the second motor when coupled to the engine. The controller is further configured to control operation of the engine.

9 Claims, 2 Drawing Sheets

ELECTRIC VEHICLE WITH RANGE-EXTENDING ENGINE AND CLIMATE CONTROL COMPRESSOR

TECHNICAL FIELD

The disclosure relates to electrical and mechanical power flow in an electric vehicle with a range-extending engine and a climate control compressor.

BACKGROUND

Passenger and commercial vehicles include various battery-powered components, such as an electric motor. When used with hybrid or electric vehicles, the electric motor can provide a torque to other vehicle components such as an air-conditioning compressor or heat pump, which may be collectively referred to as a climate control compressor. Hybrid vehicles may further include an engine and generator to extend the driving range of the vehicle.

SUMMARY

An example vehicle includes a vehicle body, a first motor, and a second motor. The second motor is disposed within the vehicle body and configured to generate a propulsion torque. An engine is removably disposed on the vehicle body and configured to selectively provide torque to the first motor when disposed on the vehicle body. A climate control compressor is disposed within the vehicle body and selectively coupled to the first motor. A controller is configured to control the coupling of the climate control compressor to the first motor and to control the coupling of the engine to the first motor. The controller is also configured to control the operation of the engine.

The above features and the advantages of the present disclosure are readily apparent from the following detailed description of the best modes for carrying out the invention when taken in connection with the accompanying drawings.

DETAILED DESCRIPTION

A vehicle is provided that has a first motor configured to drive various vehicle components and charge a power source while a second motor is configured to propel the vehicle using electrical energy from the power source or generated by the first motor. An engine is configured to provide a torque to the first motor and a climate control compressor selectively coupled to the first motor. The vehicle may further include a controller configured to control the coupling of the climate control compressor to the first motor. In one possible implementation, the vehicle further includes a first clutch assembly, a second clutch assembly, and a third clutch assembly. The first clutch assembly is disposed between the first motor and the climate control compressor and configured to actuate to operably connect the climate control compressor to the first motor. The second clutch assembly is operably disposed between the first motor and the engine and is configured to actuate to operably connect the first motor to the engine. The third clutch assembly is disposed between the first motor and a gearbox. The first motor is configured to generate electrical energy and store the electrical energy in the power source when coupled to the engine via the first clutch assembly. A controller is configured to control the actuation of the first clutch assembly and the second clutch assembly. In some possible approaches, some vehicle components may be disposed within a body of the vehicle (e.g., a vehicle body). The engine, however, may be removably disposed on the vehicle body (e.g., an outboard engine) so that the engine may be removed if not needed.

Accordingly, the vehicle described herein may provide various modes of operation that extend the vehicle's electric-only driving range. Moreover, in some implementations, the vehicle may accommodate smaller components (e.g., a smaller motor, a smaller engine, etc.), which may reduce the weight of the vehicle, and thus, increase the driving range of the vehicle. The vehicle may take many different forms and include multiple and/or alternate components and facilities. While an example vehicle is shown in the Figures, the components illustrated in the Figures are not intended to be limiting. Indeed, additional or alternative components and/or implementations may be used.

Figure 1:
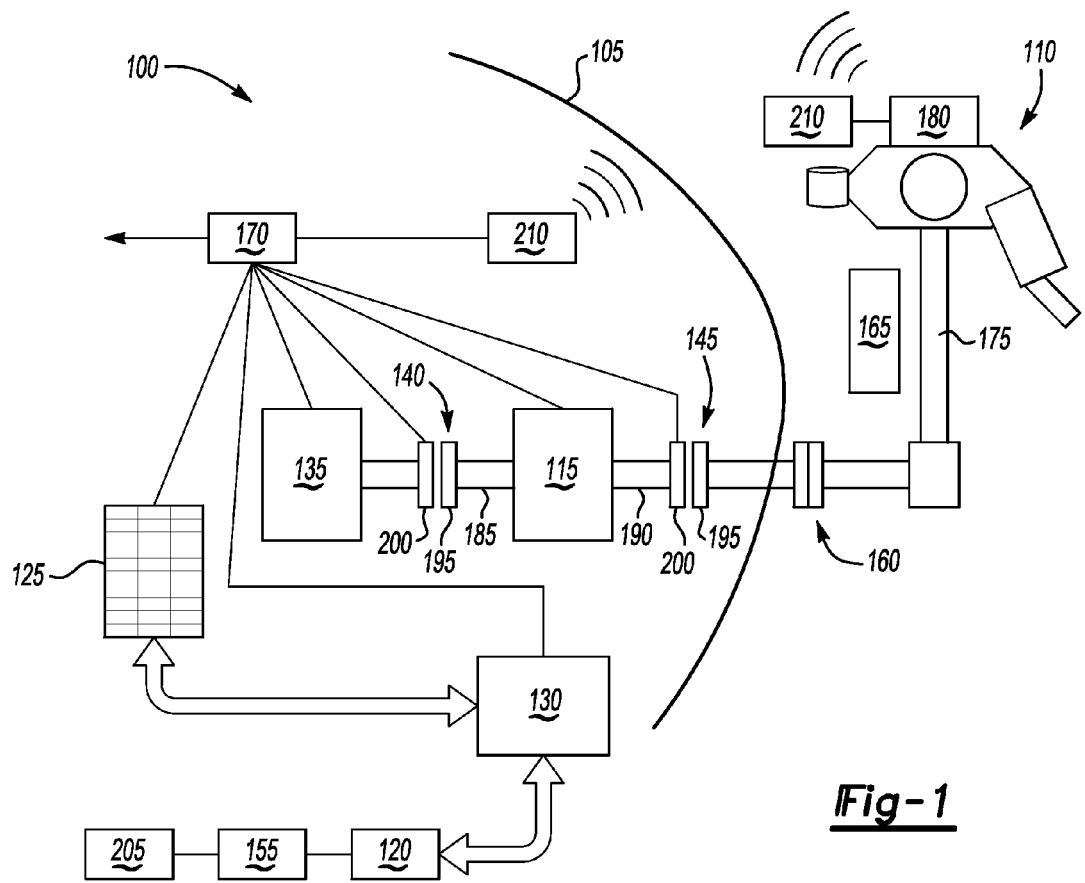
FIG. 1 is a schematic diagram of an example electric or hybrid vehicle having a detachable engine.

FIG. 1 illustrates an example vehicle 100 having a vehicle body 105, an engine 110, a first motor 115, a second motor 120, a power source 125, an inverter 130, a climate control compressor 135, a first clutch assembly 140, a second clutch assembly 145, a gearbox 155, a drive coupling 160, a fuel source 165, and a controller 170. The vehicle 100 may be any passenger or commercial automobile. Further, various features of the vehicle 100 as disclosed herein may be implemented in a hybrid electric vehicle 100 including a plug-in hybrid electric vehicle (PHEV) or an extended range electric vehicle (EREV), a battery electric vehicle (BEV), or the like.

The vehicle body 105 may include any part of the vehicle 100 configured to house or support one or more of the various vehicle components described. For instance, the vehicle 100 housing may be configured to house the first motor 115, the second motor 120, the power source 125, the inverter 130, the climate control compressor 135, the first clutch assembly 140, and the second clutch assembly 145, the third clutch assembly 150 (see FIG. 3), etc. The vehicle body 105 may further house the controller 170. Accordingly, each of these components of the vehicle 100 may be disposed within the vehicle body 105. In one possible implementation, the vehicle body 105 may be configured to allow the engine 110 to be removably disposed on the vehicle body 105. That is, as discussed in greater detail below, the engine 110 may be disposed on the vehicle body 105 (e.g., outside the vehicle 100) when operably connected to the first motor 115 and easily removed from the vehicle body 105 so that the vehicle 100 may be operated without the engine 110.

The engine 110 may include any device configured to generate a torque by, for instance, converting energy from a fuel into rotational motion. Accordingly, the engine 110 may be an internal combustion engine configured to generate a torque by burning a combination of fuel and air. The engine 110 may output the torque by rotating a crankshaft 175. The engine 110 may be used to provide power in various circumstances, such as when the power source 125 is unable to provide a sufficient amount of energy for, e.g., the first motor 115 or the second motor 120 to operate. Moreover, as discussed in greater detail below, the engine 105 is configured to be removable relative to the vehicle body 105 while the first motor 115, second motor 120, and climate control compressor 135 remained fixed within the vehicle 100 and maintain their service to the vehicle 100. The operation of the engine 110 may be controlled wirelessly by the controller 170 via, e.g., an engine control unit 180 as described in greater detail below.

The first motor 115 and the second motor 120 may each include any device configured to generate a torque from electrical energy. The first motor 115 may be further configured to generate electrical energy when provided with a torque. For instance, the first motor 115 may include an output shaft 185 that rotates when the first motor 115 is provided with electrical energy. The first motor 115 may further include an input shaft 190. When the input shaft 190 is rotated, the first motor 115 may generate electrical energy. Alternatively, the first motor 115 may be configured to transfer torque from the input shaft 190 to the output shaft 185 without generating electrical energy. The first motor 115 may be configured to use and generate alternating current (AC) energy that can be used, e.g., to provide electrical energy to the power source 125 and/or the second motor 120, as discussed in greater detail below.

The second motor 120 may be a drive or propulsion motor configured to receive electrical energy from the power source 125 that was generated by, e.g., the first motor 115. The second motor 120 may be configured to generate a propulsion torque from the electrical energy received to propel the vehicle 100. For example, the second motor 120 may be configured to provide the propulsion torque to wheels 205 of the vehicle 100.

The power source 125 may include any device configured to store electrical energy generated by the first motor 115 and/or provide electrical energy to the first motor 115 and the second motor 120. For instance, the power source 125 may include one or more batteries configured to store electrical energy generated by the first motor 115. In one possible implementation, the power source 125 is configured to store and output electrical energy as direct current (DC) electrical energy.

The inverter 130 may include any device configured to convert DC energy to AC energy. In one possible approach, the inverter 130 may be operatively disposed between the power source 125 and the first and second motors 115, 120. The inverter 130 may be further configured to convert the AC energy generated by the first motor 115 into DC energy for storage in the power source 125. Moreover, the inverter 130 may be configured to convert the DC energy stored in the power source 125 into AC energy used to drive the first motor 115 and/or the second motor 120. Although only one inverter 130 is shown, the vehicle 100 may include any number of inverters 130.

The climate control compressor 135 may include any device configured to control the climate of the vehicle 100. For instance, the climate control compressor 135 may include an air-conditioning compressor configured to provide air conditioning to the vehicle 100 and/or a heat pump to heat the vehicle 100. In one possible approach, the climate control compressor 135 may be operatively connected to the engine 110, the first motor 115, or both. For air conditioning, the climate control compressor 135 may receive torque from the engine 110 and/or first motor 115 and compress a refrigerant. The climate control compressor 135 may include a condenser to further cool the compressed air. A fan may be used to circulate the cooled air throughout the vehicle 100. For heat, the climate control compressor 135 may operate as a heat pump to heat a passenger compartment of the vehicle 100.

The first and second clutch assemblies 140, 145, as well as the third clutch assembly 150 (see FIG. 3) may each include any device, such as a hydraulically or electrically actuated device, configured to actuate and transfer torque. For instance, each clutch assembly 140, 145, 150 may include a driving mechanism 195 and a driven mechanism 200. With respect to the first clutch assembly 140, the driving mechanism 195 may be operably connected to the first motor 115 and the driven mechanism 200 may be operably connected to the climate control compressor 135. When engaged, the torque generated by the first motor 115 may be transferred to the climate control compressor 135. As such, the first clutch assembly 140 may be used to selectively couple the climate control compressor 135 to the first motor 115.

The driving mechanism 195 of the second clutch assembly 145 may be operably connected to the engine 110, and the driven mechanism 200 of the second clutch assembly 145 may be operably connected to the first motor 115. When the second clutch assembly 145 is engaged, the torque generated by the engine 110 may be transferred to the first motor 115. Therefore, the second clutch assembly 145 may be used to selectively couple the engine 110 to the first motor 115. As discussed in greater detail below, the operation of the first and second clutch assemblies 130, 135 may be controlled by an electronic device, such as a controller 170 as described below.

The gearbox 155 may include any device configured to transfer torque to the wheels 205. Therefore, the engine 110 of FIG. 1 may be configured to provide a propulsion torque that may propel the vehicle. The gearbox 155 may include any number of gears having various sizes. As illustrated, the gearbox 155 is configured to receive torque from the first motor 115, the second motor 120, or both, and output the torque received to the wheels 205 of the vehicle 100.

The drive coupling 160 may include any device configured to connect the engine 110 to the vehicle 100 and allow the engine 110 to provide torque to the first motor 115 when connected to the vehicle body 105. Thus, the drive coupling 160 may be operably disposed between the engine 110 and the second clutch assembly 145. Moreover, the drive coupling 160 may include a mechanical interface that allows the engine 110 to be removably disposed on the vehicle body 105. That is, the drive coupling 160 may be configured to allow a driver, for example, of the vehicle 100 to easily attach and detach the engine 110 from the vehicle 100. In one possible implementation, the drive coupling 160 may be accessible from outside of the vehicle body 105.

The fuel source 165 may include any device configured to provide fuel to the engine 110. If the engine 110 is an internal combustion engine 110, the fuel source 165 may include a fuel bladder or a fuel tank configured to store gasoline. Although not shown, a fuel pump may be used to provide fuel from the fuel source 165 to the engine 110.

The engine control unit 180 may include any device configured to control the operation of the engine 110. For instance, the engine control unit 180 may control the rotational speed of the engine 110 by controlling the flow of fuel from the fuel source 165 to the engine 110. The engine control unit 180 may include or use a transceiver 210 configured to receive wireless control signals, and the engine control unit 180 may be configured to control the engine 110 based on the wireless control signals received. In one possible implementation, the engine control unit 180 and the engine transceiver 210 may be powered by a magneto generator or alternator and an energy storage device (not shown). The engine control unit 180, therefore, need not be hardwired to the vehicle 100. Rather, the engine control unit 180 may be disposed on the engine 110 or within a housing of the engine 110. This way, the engine control unit 180 may be removed from the vehicle 100 when the engine 110 is detached from the vehicle body 105.

The controller 170 may include any device configured to control the operation of various components of the vehicle 100. For example, the controller 170 may be configured to control the selective coupling of the climate control compressor 135 to the first motor 115 by controlling actuation (e.g., engagement) of the first clutch assembly 140. By engaging the first clutch assembly 140, the controller 170 may cause the first motor 115 to provide a torque to the climate control compressor 135. The controller 170 may be configured to control the selective coupling of the engine 110 to the first motor 115 by controlling the actuation (e.g., engagement) of the second clutch assembly 145. By engaging the second clutch assembly 145, the controller 170 may cause the engine 110 to provide a torque to the first motor 115, which may cause the first motor 115 to generate electrical energy for storage in the power source 125.

The controller 170 may be further configured to generate and transmit a control signal to the engine control unit 180. For instance, the controller 170 may receive a throttle command based on actuation of an accelerator pedal (not shown) in a passenger compartment of the vehicle 100. The controller 170 may use a transceiver 210 to transmit the control signal to the engine control unit 180. In one possible implementation, the transceiver 210 is part of the controller 170. The transceiver 210 may alternatively be a separate device than the controller 170, however.

In general, computing systems and/or devices, such as the engine control unit 180 and the controller 170, may employ any of a number of computer operating systems and may include computer-executable instructions, where the instructions may be executable by one or more computing devices such as those listed above. Computer-executable instructions may be compiled or interpreted from computer programs created using a variety programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Some forms of computer-readable media may include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In operation, the controller 170 may control the actuation of the first and second clutch assemblies 140, 145 based on the desired operation of the climate control compressor 135. For example, the controller 170 may open (e.g., disengage) both the first and second clutch assemblies 140, 145 any time the first motor 115 and engine 110 are both disabled, such as when the climate control compressor 135 is turned off and the power source 125 has an adequate charge to provide electrical energy to various components of the vehicle 100.

If the charge held by the power source 125 drops below a predetermined level, however, the controller 170 may open (e.g., disengage) the first clutch assembly 140, close (e.g., engage) the second clutch assembly 145, and fire the engine 110 so that the engine 110 transfers torque to the first motor 115. In this configuration, the first motor 115 may act as a generator to provide electrical energy that may be stored in the power source 125. The first motor 115 may generate alternating current energy that the inverter 130 may convert to direct current energy for storage in the power source 125.

If the climate control compressor 135 is needed while the power source 125 is being charged, the controller 170 may close the first clutch assembly 140 to operably connect the climate control processor to the first motor 115 and close the second clutch assembly 145 to operably connect the engine 110 to the first motor 115. In this configuration, the engine 110 provides torque to the first motor 115 to cause the first motor 115 to generate electrical energy. The first motor 115 may further transfer some of the torque generated by the engine 110 to the climate control compressor 135 so that the climate control compressor 135 may be operated. This way, the first motor 115 may operate the climate control compressor 135 and charge the power source 125 simultaneously.

If the charge of the power source 125 is sufficient and operation of the climate control compressor 135 is desired, the controller 170 may disable the engine 110 (e.g., turn the engine 110 off), close the first clutch assembly 140 to operably connect the first motor 115 to the climate control compressor 135, and open the second clutch assembly 145. The first motor 115 may use the electrical energy stored in the power source 125 to provide a torque to the climate control compressor 135. Alternatively, the controller 170 may keep the engine 110 on (e.g., firing) and close both the first clutch assembly 140 and the second clutch assembly 145. The second clutch assembly 145 may allow torque to transfer from the engine 110 to the first motor 115, and the first clutch assembly 140 may allow the torque provided to the first motor 115 from the engine 110 to be transferred from the first motor 115 to the climate control compressor 135. This way, the climate control compressor 135 may be operated by the engine 110 without the first motor 115 drawing electrical energy from the power source 125.

The controller 170 may further be configured to crank the engine 110 using the first motor 115 and the second clutch assembly 145. That is, the first motor 115 may open the first clutch assembly 140 and close the second clutch assembly 145 so that torque generated by the first motor 115 may be transferred to the engine 110. The controller 170 may command the engine 110 to begin firing using wireless signals transmitted to the engine control unit 180. The controller 170 may further command the first motor 115 to begin to rotate using electrical energy stored in the power source 125. The combination of the engine 110 firing and the torque provided by the first motor 115 may cause the engine 110 to start.

The example vehicle 100 described herein may allow the engine 110 to be easily attached to and removed from the vehicle body 105. Therefore, during short trips where the power source 125 can provide sufficient electrical energy to the propulsion first motor 115, the driver or another person may remove the engine 110 from the vehicle body 105. Removing the engine 110 reduces the weight and increases the distance the vehicle 100 may be able to travel in electric-only operation. During longer trips that may deplete the electrical energy stored in the power source 125, however, the driver or another person may attach the engine 110 to the vehicle body 105 so that the power source 125 may be charged by the engine 110 and first motor 115 as described above.

Since the communication between the controller 170 and the engine control unit 180 may be wireless, attaching and detaching the engine 110 from the vehicle body 105 may not require the driver to attach and detach wires or cables. As discussed above, the drive coupling 160 may provide a mechanical interface for the engine 110 and the vehicle body 105 and need not further provide an electrical interface, although it may in some circumstances (e.g., when wireless communication between the controller 170 and engine control unit 180 is not desired).

Moreover, the engine 110 may be disposed within the vehicle body 105 or, alternatively, on the vehicle body 105 on the outside of the vehicle 100. For example, as illustrated in FIG. 1, the engine 110 may be an outboard engine disposed on the vehicle body 105 to, for instance, facilitate attachment and detachment of the engine 110 to the vehicle 100.

Figure 2:
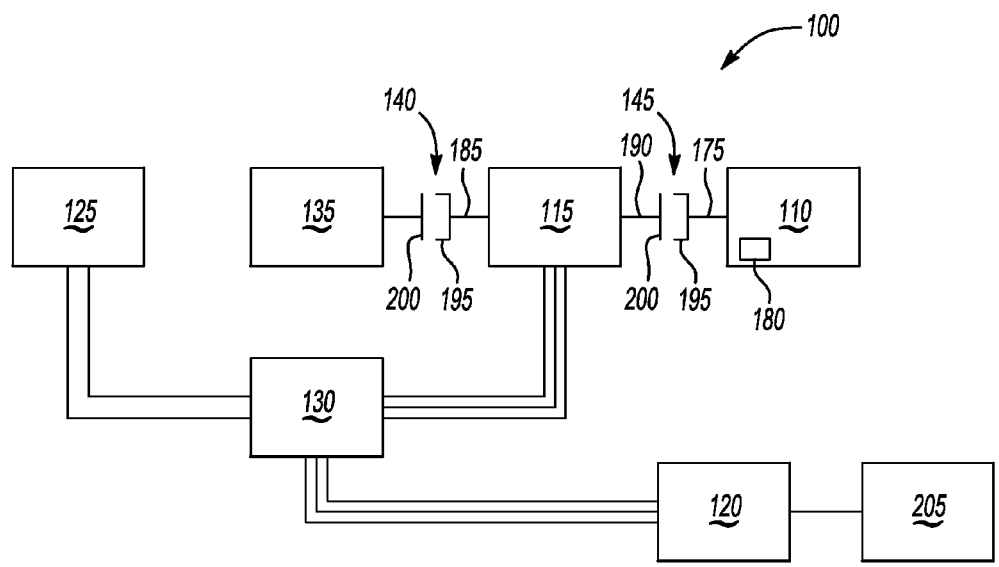
FIG. 2 is a schematic diagram of example components of an electric or hybrid vehicle.

FIG. 2 is a schematic diagram of the components of the vehicle 100 arranged in an example series hybrid powertrain configuration. The example implementation of the vehicle 100 as illustrated in FIG. 2 allows the engine 110, the first motor 115, and the climate control compressor 135 to, e.g., have a relatively small capacity compared to the power source 125 and the second motor 120 since the engine 110 illustrated in FIG. 2 does not propel the vehicle 100. For instance, the engine 110 illustrated in FIG. 2 not need have substantially more output capacity than the sum total of the first motor 115 and the climate control compressor 135 inputs. By way of example only, the first motor 115 and climate control compressor 135 may each have a 10 kW maximum mechanical input so, in one possible approach, the engine 110 may have a maximum useful output of only 15 kW since the engine 110 does not provide torque to other vehicle 100 components such as the wheels 205. The second motor 120 (e.g., the drive motor), on the other hand, may be capable of providing a 50 kW output using 8 kW of electrical energy from the first motor 115 (e.g., via the power source 125) and 42 kW from electrical energy stored in the power source 125.

Figure 3:
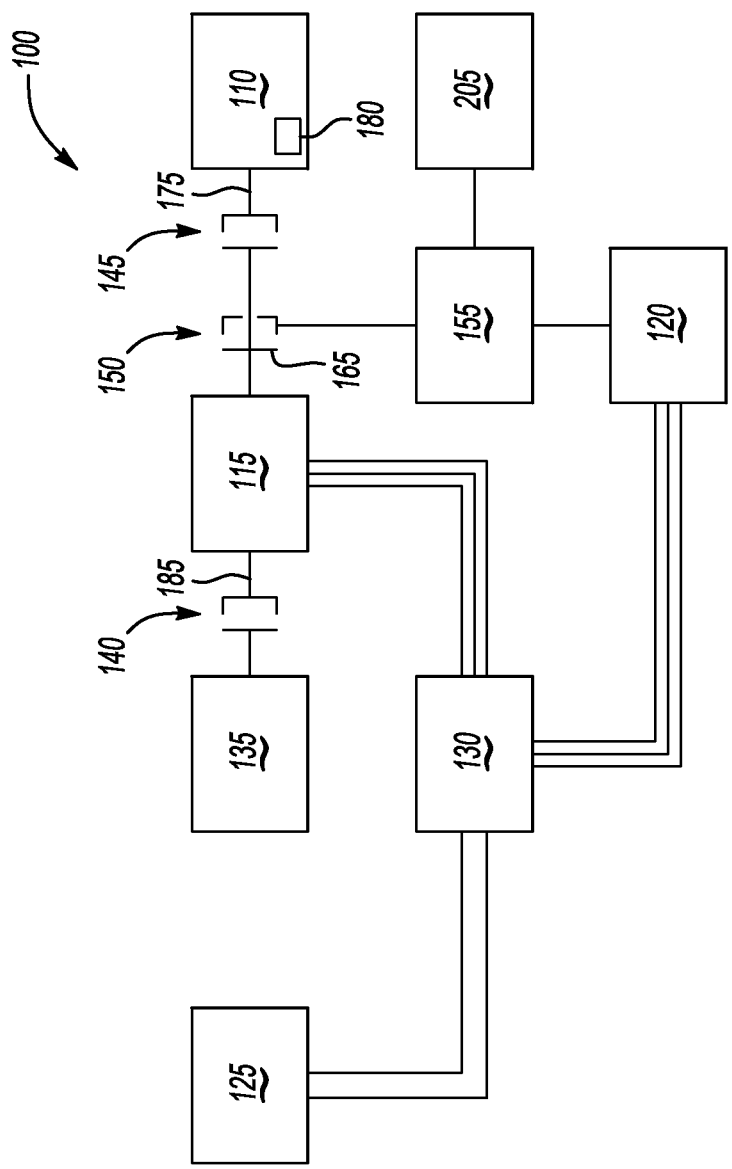
FIG. 3 is a schematic diagram of example components of another electric or hybrid vehicle.

FIG. 3 is a schematic diagram of the components of the vehicle 100 arranged in an example power-split hybrid powertrain configuration. The example implementation of FIG. 3 includes the engine 110, the first motor 115, the power source 125, the inverters 120, the climate control compressor 135, the first clutch assembly 140, the second clutch assembly 145, and the second motor 120 as described above with respect to FIG. 1. The vehicle 100 may further include the gearbox 155 and the third clutch assembly 150, as described above. Like the first and second clutch assemblies 140, 145, the third clutch assembly 150 may include any device or devices configured to actuate and transfer torque. For instance, the third clutch assembly 150 may include a driving mechanism 195 operably connected to the first motor 115 and the driven mechanism 200 operably connected to the gearbox 155. The driving mechanism 195 and the driven mechanism 200 may engage so that the torque generated by the first motor 115 may be transferred to the wheels 205 via the gearbox 155. Accordingly, the first motor 115 may provide a torque to the gearbox 155, via the third clutch assembly 150, to propel the vehicle 100. In an alternative operating mode, the second motor 120 may provide the propulsion torque to the gearbox 155 to propel the vehicle 100.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
a vehicle body;
a first motor disposed within the vehicle body;
a second motor disposed within the vehicle body and configured to generate a propulsion torque;
an engine removably disposed on an outside portion of the vehicle body and configured to be selectively coupled with the first motor through the vehicle body, and wherein the engine is configured to selectively provide torque to the first motor;
a climate control compressor disposed within the vehicle body and selectively coupled to the first motor; and
a first clutch assembly disposed between the first motor and the climate control compressor, the first clutch configured to operably connect the climate control compressor to the first motor;
a second clutch assembly disposed between the engine and the first motor, the second clutch configured to operably connect the engine to the first motor; and
a controller configured to control the coupling of the climate control compressor to the first motor through the first clutch assembly and to control the coupling of the engine to the first motor through the second motor assembly, and wherein the controller is configured to control operation of the engine;
wherein the engine, the first motor, and the climate control compressor are in a series torque-transmitting arrangement; and
wherein the first motor is an electric motor, the second motor is an electric motor, and the engine is an internal combustion engine.

2. A vehicle as set forth in claim 1, wherein the controller is configured to control the actuation of the first clutch assembly.

3. A vehicle as set forth in claim 1, wherein the controller is configured to control the actuation of the second clutch assembly.

4. A vehicle as set forth in claim 1, wherein the controller is configured to generate a control signal and wherein the controller includes a transmitter configured to wirelessly transmit the control signal.

5. A vehicle as set forth in claim 4, wherein the engine includes an engine control unit configured to receive the control signal wirelessly transmitted by the controller.

6. A vehicle as set forth in claim 1, wherein the climate control compressor includes at least one of an air-conditioning compressor and a heat pump.

7. A vehicle as set forth in claim 1, wherein coupling the engine to the first motor causes the first motor to generate electrical energy.

8. A vehicle as set forth in claim 7, further comprising a power source disposed within the vehicle body and configured to store the electrical energy generated by the first motor.

9. A vehicle as set forth in claim 1, wherein the engine is capable of providing a torque to the climate control compressor through the first motor.

* * * * *